United States Patent [19]

Herzner

[11] 4,192,633

[45] Mar. 11, 1980

[54] COUNTERWEIGHTED BLADE DAMPER

[75] Inventor: Frederick C. Herzner, Fairfield, Ohio

[73] Assignee: General Electric Company, Cincinnati, Ohio

[21] Appl. No.: 865,343

[22] Filed: Dec. 28, 1977

[51] Int. Cl.[2] ............................ F01B 5/30; F01B 5/26
[52] U.S. Cl. .................................... 416/221; 416/500; 415/119
[58] Field of Search ................ 415/119; 416/221, 500, 416/220 R

[56] References Cited

U.S. PATENT DOCUMENTS

| | | | |
|---|---|---|---|
| 2,999,668 | 9/1961 | Howald et al. | 416/500 |
| 3,181,835 | 5/1965 | Davis | 416/500 |
| 3,700,354 | 10/1972 | Memery | 416/221 |
| 3,751,183 | 8/1973 | Nichols et al. | 416/500 |
| 3,768,924 | 10/1973 | Corsmeier et al. | 416/220 |
| 3,814,539 | 6/1974 | Klompas | 416/221 |

Primary Examiner—Louis J. Casaregola
Attorney, Agent, or Firm—Dana F. Bigelow; Derek P. Lawrence

[57] ABSTRACT

A segmented damper is provided with a lower dovetail portion which is insertable into a dovetail slot for radial retention and which is engageable on its face by a blade retainer for axial retention, such that the damper is pivotable in an axial plane. The damper upper portion has on its one side a flange for engaging the blade shank rail and on its other side a flange for shifting the damper center of gravity axially outward from the lower pivot point. Centrifugal force, occasioned by rotation of the disk and damper, then causes the damper to pivot and impart an axial force against the blade to thereby dampen vibrations.

15 Claims, 19 Drawing Figures

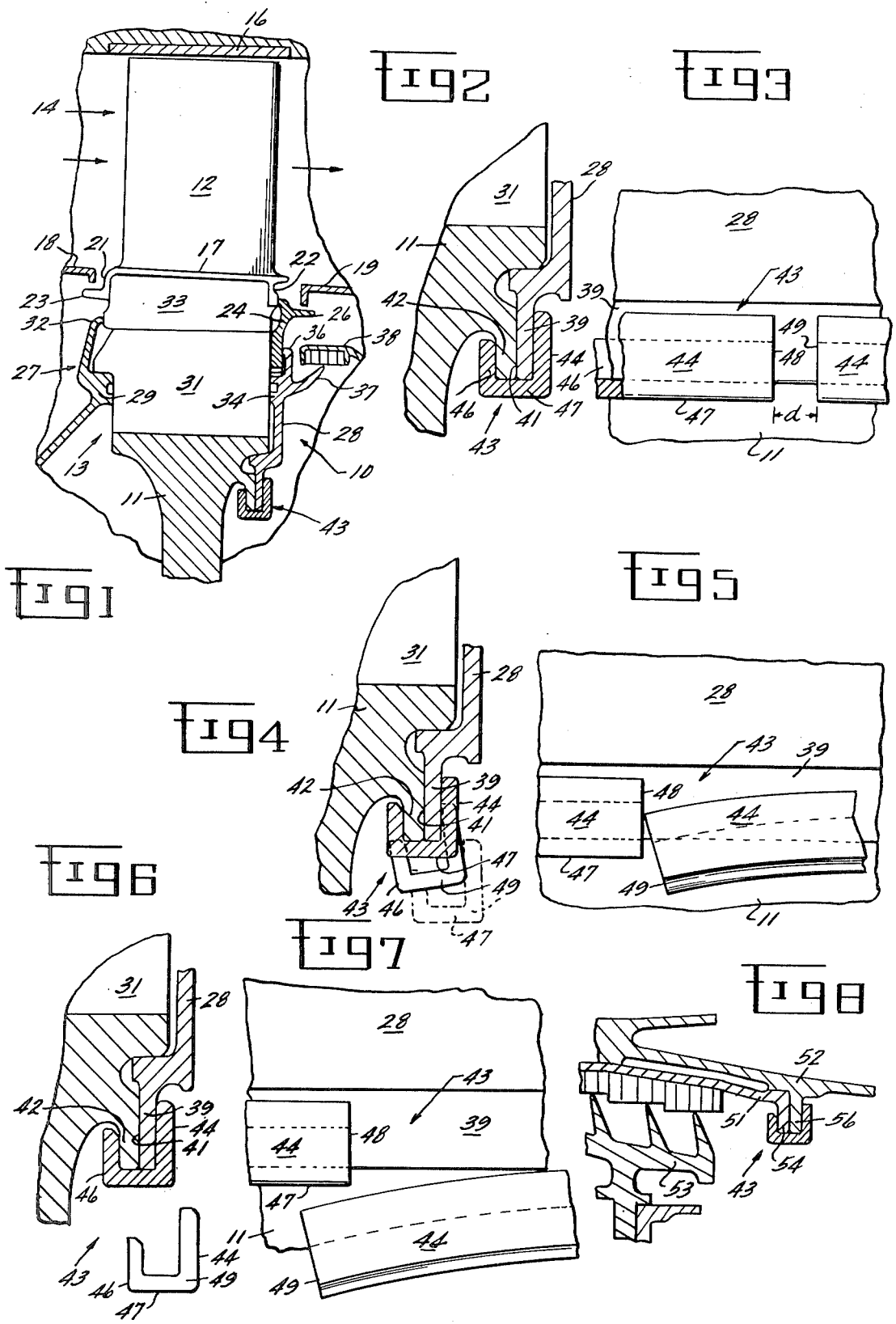

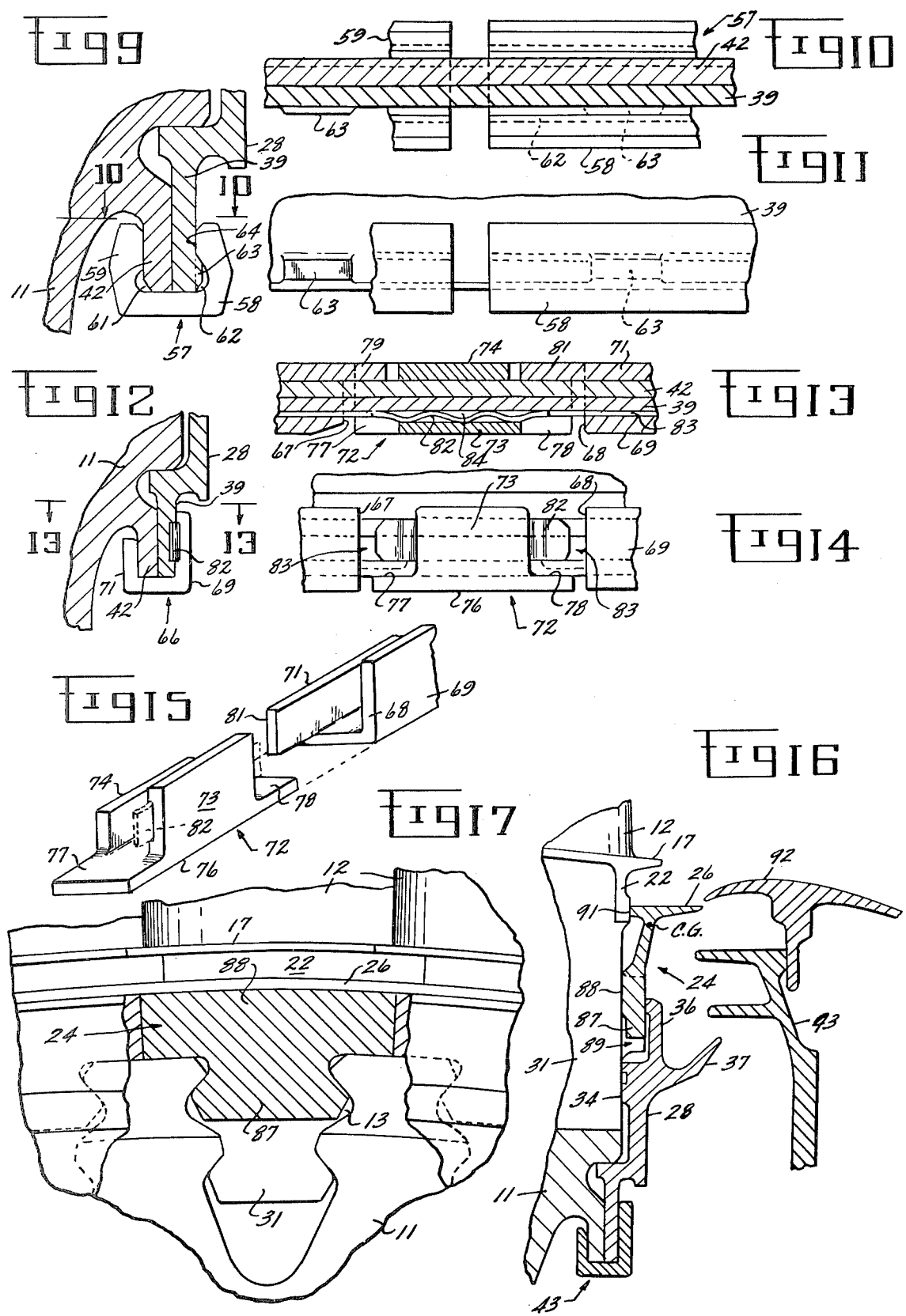

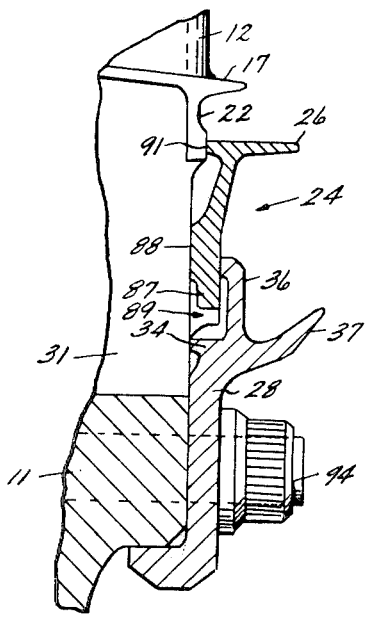
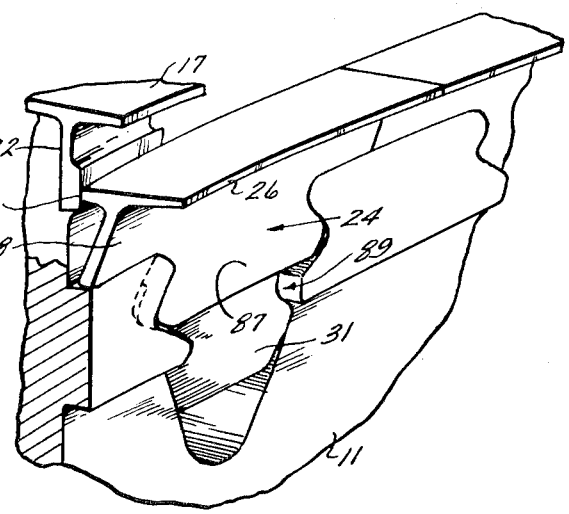

COUNTERWEIGHTED BLADE DAMPER

BACKGROUND OF THE INVENTION

This invention relates generally to turbomachinery and, more particularly, to a segemented damper for a turbomachine blade.

The invention described herein was made in the course of or under a contract, or a subcontract thereunder, with the United States Department of the Air Force.

In turbomachinery rotor assemblies of the type having a plurality of blades extending radially from a rotor, wheel or disk, a common problem encountered is the vibration which occurs between the rotor disk and the blade or between the blades themselves. The occurrence and degree of this vibration is a function of many factors, as for example gas temperature, turbine speed, and the method by which the blades are retained within the rotor. Generally, any vibratory displacement which occurs is most severe in the blade tip but the effects thereof may act on any portion of the blade to eventually cause undesirable fatigue failure. Other undesirable effects of the vibration include the complications of suitably retaining the blades within the disk. One common method by which the effects of the vibratory forces are lessened is that of using blade shrouds to interconnect adjacent blades so as to provide a mutual damping function to the combination. In some blade combinations a blade tip shroud has been found suitable for the purpose, while in other applications a midspan shroud has been found to more accurately prevent blade vibrations. Other methods of attaining this function include various schemes by which the damping function is applied to the root of the blade or at some place in the blade retaining device. However, a common problem exists in the various prior art methods in that they generally offer mechanical complications of installation, or involve expenses which cause them to be prohibitive.

A common approach is to employ a ring which is attached at its inner portion to the disk by bolts or the like, and which extends radially outward to act at its intermediate point as a blade retainer device and at its radially outer point as a blade damper device. Such a design relies on the mechanical interference of the ring and the disk to provide the required damping of the blade and is further inherently dependent on the ring-to-blade interference. Where high temperatures are involved, as in a turbine, the retainer ring must be temperature/creep resistant in order to ensure good damping engagement with the blade. Further, such retainers are generally manufactured of forged materials which are less capable of withstanding high temperature exposure. Another complication is that thermal hoop stresses are caused in such a ring arrangement, especially during turbomachine acceleration and deceleration. Such high stress temperatures, therefore, tend to limit the low cycle fatigue life of such a ring retainer.

It is therefore an object of the present invention to provide a blade damper which is not dependent on temperature and creep strength for proper performance.

Another object of the present invention is the provision for a blade damper which is not subject to hoop stresses caused by high temperatures.

Yet another object of the present invention is the provision for a blade damper which is not composed of a forged material which is incapable of withstanding high temperature exposure.

Yet another object of the present invention is the provision of a blade damper which is not susceptible to low cycle fatigue caused by cyclic variable operation.

A further object of the present invention is the provision of a blade damper which is relatively easy to manufacture, simple to assemble, and effective in use.

These objects and other features and advantages become more readily apparent upon reference to the following description when taken in conjunction with the appended drawings.

SUMMARY OF THE INVENTION

Briefly, in accordance with one aspect of the invention, each blade is provided with its own segmented damper which is formed by a process such as casting which allows the damper to be exposed to high temperatures without resultant creep. The damper is radially and axially secured at its inner end in such a way as to be pivotable in an axial plane. The upper, or radially outward, end of the damper includes a flange on one side for engaging the blade, and has a flange on its other side for establishing a damper center of gravity which is axially spaced, in a direction away from the disk, from the center of axial pivot. The axial or damping force exerted against the blade is then dependent on the centrifugal force resulting from rotation of the damper.

By another aspect of the invention, the damper is radially secured at its radially inward end by way of a dovetail which fits into the dovetail slot so as to restrict the damper from movement in either radial direction.

By yet another aspect of the invention, axial retention of the damper is provided by a blade retainer which engages one side of the damper dovetail to thereby transmit its axial force through the dovetail and to the blade dovetail. Since the damping force is generated by centrifugal force, the pressure against this dovetail is not critical. That is, it need only hold the damper in place and is independent of the required damping force.

In the drawings as hereinafter described, a preferred embodiment and modified embodiments are depicted; however, various other modifications and alternate constructions can be made thereto without departing from the true spirit and scope of the invention.

BRIEF DESCRIPTION OF THE DRAWINGS

FIG. 1 is a fragmentary axial sectional view of a turbine disk and blade assembly in accordance with the preferred embodiment of the invention;

FIG. 2 is an enlarged view of the retainer ring portion thereof;

FIG. 3 is a fragmentary end view thereof;

FIG. 4 is a sectional view of the retainer ring portion of the apparatus as shown in the partially disassembled position;

FIG. 5 is a fragmented end view thereof;

FIG. 6 is a cross-sectional view of the retainer ring portion of the apparatus as shown in a further disassembled position;

FIG. 7 is a fragmented end view thereof;

FIG. 8 is a sectional view of the retainer ring portion of the apparatus as applied for an alternate purpose;

FIG. 9 is an axial cross-sectional view of a modified embodiment of the retainer ring portion of the apparatus;

FIG. 10 is a partial view thereof as seen along lines 10—10 of FIG. 9;

FIG. 11 is a fragmented end view thereof;

FIG. 12 is an axial cross-sectional view of another embodiment of the retainer ring portion of the apparatus;

FIG. 13 is a partial view thereof as seen along lines 13—13 of FIG. 12;

FIG. 14 is a fragmented end view thereof;

FIG. 15 is a perspective view of the bridging element thereof;

FIG. 16 is an axial cross-sectional view of the blade retaining and damping apparatus in accordance with the present invention;

FIG. 17 is a fragmented end view thereof with a portion shown in cross section;

FIG. 18 is a perspective view of the damper and related portions thereof; and

FIG. 19 is an axial cross-sectional view of the damper element as applied to a modified embodiment of the blade retainer apparatus.

DESCRIPTION OF THE PREFERRED EMBODIMENT

Referring to FIG. 1, the invention is shown generally at 10 as applied to a turbine disk 11 having a plurality of turbine blades 12 secured in axial dovetail slots 13 of the disk. The blades project radially into a flow path 14 which is defined in that plane by a shroud 16 on the outer side and the blade platform 17 on the inner side. Vane platforms 18 and 19 partially define the inner flow path upstream and downstream of the row of blades 12.

Extending radially inward from the blade platform 17 are forward and aft shank rails 21 and 22, respectively. The forward shank rail 21 has a forward-extending flange 23 which is disposed in close relationship with the vane platform 28 for sealing purposes. The aft shank rail 22 has a sealing surface formed on the downstream side thereof which is closely engaged by a seal/damper which acts to dampen vibrations in the blade 12 as will be more fully described hereinafter. In a manner similar to that of the forward shank rail 21, the seal/damper 24 has a rearwardly extending flange 26 which is disposed in close sealing relationship with the downstream vane platform 19.

Axial retention of the blades 12 in the dovetail slots of the disk 11 is provided by a forward retainer/seal and aft retainer/seal 27 and 28, respectively. The forward retainer/seal has a retainer portion 29 which forms an axial interference fit with the blade dovetail to prevent forward axial movement of the blade within the dovetail slot. It also includes a seal portion 32 which tightly engages the forward edge of the blade shank 33 to prevent the flow of cooling air radially outward between the mating parts.

On the rear side of the disk 11, the aft retainer/seal 28 has a retainer portion 34 which tightly engages the dovetail portion of the blade to prevent its axial movement rearward. It also includes a seal/damper retainer portion 36 which acts in a manner to be further described hereinafter. Also included as part of the aft retainer/seal element is an aft flange 37 which extends rearwardly and radially outward to engage a stationary seal element 38 for the purpose of sealing the inner cooling airflow from the outer hot gas flow.

Further describing the structure of the aft retainer/seal 28, it comprises a ring which closely hugs the disk rear side and angles toward the disk to terminate on its radially inner end with an annular flange 39. One face 41 of the flange 39 is disposed in close-fit engagement with a face of an annular flange 42 projecting rearwardly and radially inwardly from the disk 11 as shown in FIG. 2. A U-clip retainer ring having its open side facing radially outward fits over the two flanges 39 and 42 to hold them in tight axial relationship such that the retainer/seal 28 is held to performance retainer function. The U-clip retainer ring 43 comprises axially extending outer and inner walls 44 and 46, respectively, interconnected by an axially extending wall 47. It will be recognized that in the preferred embodiment of the invention as shown in FIGS. 1 through 8, the radial height of the outer wall 44 is substantially greater than the radial height of the inner wall 46. This difference in radial heights can be varied somewhat to accommodate a particular structure to which it is applied, but it is critical to the proper operation of the retainer ring 43 as will be more clearly seen hereinafter. Generally, it can be said that the difference between the radial height of the outer and inner walls is less than one-half the radial height of the outer wall. There is, of course, a maximum limit of this difference in radial height which must be determined by consideration of the actual structure to which it is applied and the performance characteristics which are desired. It may be generally said that the difference between the radial heights of the outer and inner walls should be greater than one-fourth the radial height of the outer wall.

As can be seen in FIG. 3, there exists a gap having a dimension D between the two ends 48 and 49 of the retainer ring 43. Again, in accordance with the preferred embodiment of the invention, the circumferential length of the retainer ring 43 is such that when the ring is placed in its installed position as shown in FIG. 3, the length of the gap D between the two ends is such that the ring 43 can be easily assembled into its holding position and will not come out of that holding position without being subjected to certain removal procedures as will be described hereinafter. Generally, it can be said that the length of the gap should be less than one-half of the radial height of the outer wall 44.

Considering now the assembly and disassembly of the retainer ring 43, the procedure is substantially the same except in reverse. We will therefore only describe the disassembly or removal process. Referring to FIG. 4, the U-clip is shown in its assembled position as represented by the hatched outline. The first step in removal is to deflect the radial ring one end 49 radially inward to the point where the open end of the inner wall 46 just clears the annular flange 42. This position is shown in FIG. 5 and by the solid line representation of the end of the ring as shown in FIG. 4. It should be noted that up to this point the ends 48 and 49 of the outer wall are in the same axial plane and thus interfere as shown in FIGS. 4 and 5 to prevent the one end 49 from being moved radially inward. The next step, now that the end of the inner wall 46 is clear of the annular flange 42, is to translate the ring end 49 axially outward as indicated by the dotted line view of FIG. 4 until the two ends of the outer wall 44 clear as shown. At this point, the end 49 can be further moved radially inward such that the ends clear as shown in FIG. 7 and as shown by the solid line view of the end 49 in FIG. 6. The ring can then be easily removed from the remaining portion of the annulus.

If the U-clip retainer ring 43 is constructed and applied as described hereinabove, it provides a means for holding in the fixed assembly position the aft retainer/seal 28 without the use of bolts or any other fasteners which tend to decrease the strength of the flanges and which tend to increase the complexity of assembly and disassembly. That is, retainer ring 43 can easily be assembled by placing the ring, except for its one end, in its finally fixed position; putting the free end in the axially displaced position as shown by the dotted line in FIG. 4; translating that end radially inward until the ends 48 and 49 are mutually engaging and the free end of the inner wall 46 is clear of the annular flange 42; and, moving the end 49 radially outward into its fixed position. The retainer ring 43 will then remain in this fixed position, during all periods of engine operation or inoperation, until one subjects it to the removal procedures as described hereinabove.

In addition to the function of holding the aft retainer/seal 28 in position, the retainer ring 43 may be used for the purpose of holding together other components having axially abutting radially inward extending flanges. An alternate use of such a U-clip retainer ring 43 is shown in FIG. 8 wherein it is applied to secure a stationary compressor discharge pressure (CDP) seal 51 to a diffuser housing 52. This allows the seal 51 to be held in its position surrounding and engaging rotatable portion 53 without the use of structure weakening, windage susceptible bolt and hole combinations. Assembly and disassembly of the retainer ring 43 with respect to the mating flanges 54 and 56 is accomplished in a manner described hereinabove. It should be noted that the difference in radial depth of the outer and inner walls, and the length of the gap between the two ends may be varied so as to enable ease of assembly while ensuring a reliable holding function.

Referring now to FIGS. 9, 10 and 11, a modified embodiment of the U-clip arrangement is provided wherein the U-clip retainer ring 57 is constructed as shown in FIG. 9. The outer and inner walls 58 and 59 are preferably, but not necessarily, of substantially equal radial height. The inner wall 59 has a rather bulbous or thickened portion near its free end and an undercut portion 61 at the radially inner portion so as to allow for flexibility in installation and removal. Similarly, the outer wall 58 has a thickened portion near its free end and an undercut 62 near the radially inner portion thereof. The undercut 62 is large enough to receive, when the U-clip is in its fixed final position, a plurality of circumferentially spaced embossments 63 formed on the one face of the annular flange 39 as shown in FIGS. 9 and 11. Formed on the thicker portion of the outer wall 58 is an inner surface 64 which is relatively flat and which is adapted to fit tightly against the annular flange 39 to hold it in tight axial relationship with the annular flange 42.

Installation of the U-clip retainer ring 57 is accomplished by the placing of the U-clip 57 just radially inward of the flanges 42 and 39, and forcing it radially outward to spring open and allow the outer wall 58 to slide over the embossments 63 and the inner wall 59 to tightly engage the one side of the annular flange 42. Installation is facilitated by beveled corners on both the inner and outer walls and on the edges of the flanges 39 and 42 as shown. Removal, of course, is accomplished by inserting a tool between the flange 39 and the outer wall 58 and springing the U-clip 57 outward to allow it to slide over the embossment 63.

Another means by which the U-clip may be secured in its fixed position is illustrated in FIGS. 12-15. Here the U-clip 66 is of a circumferential length such that when it is in place there is a substantial gap between the ends 67 and 68. The outer and inner walls 69 and 71, respectively, may be of equal radial height, but are preferably of different radial height as shown to facilitate installation. A bridging element 72 is provided to be placed between the ends 67 and 68 in such a way as to also capture the flanges 39 and 42 between its outer and inner sides 73 and 74, respectively. As will be seen in FIGS. 13, 14 and 15, neither the outer side 73 nor the inner side 74 extends circumferentially in either direction as far as does the axially extending side 76. Thus, a pair of tabs 77 and 78 are formed as extensions to the axially extending side 76. These tabs act, when the bridging element 72 is in its fixed position, to radially hold the ends 67 and 68 of the U-clip in place by engaging the edges of the projections 79 and 81 of the inner side 71. Radial retention of the bridging element 72 itself is provided by a flexible sheet metal clip 82 which fits axially between the outer side 73 and the annular flange 39 as shown in FIGS. 12-15. In order to accommodate and retain this sheet metal clip 82 a small groove 83 is formed in the one side of the annular flange 39 and a mating groove 84 is formed in the one face of the bridging element outer side 73 as shown. Assembly of the above-described embodiment is thus accomplished by first placing the U-clip in its finally assembled position; placing the bridging element 72 in its finally assembled position; and, sliding the sheet metal clip 82 into the gap between the bridging element outer side 73 and the retainer ring outer side 69; and, sliding the sheet metal clip 82 into its final position in the grooves 83 and 84. Disassembly is accomplished by the reverse method.

A description of the seal/damper 24 portion of the invention will be best understood by reference to FIGS. 16-19. The damper/seal 24 comprises a segmented element which circumferentially abuts a similar damper/seal on either side thereof, with each blade having its own individual damper/seal 24. It comprises an inner dovetail portion 87, a central body portion 88 and the outer extending flange portion 26.

The dovetail portion 87 is inserted axially into the dovetail slot 89 of the disk and is axially held in that position by the seal/damper retainer portion 36 of the aft retainer/seal 28 which lightly abuts its outer surface. In this way, retention by the dovetail slots holds the damper/seal 24 in its radial position and the aft retainer/seal 28 holds it in its axial position. Since both of these connections are substantially loose, the seal/damper is somewhat free to pivot axially within the dovetail slot 89. This feature is important in allowing the seal/damper to function in the desired manner.

The central body portion 88 of the seal/damper 24 extends radially and axially outward to terminate in the rearward extending flange 26. This flange has a forward face 91 which closely abuts the aft shank rail 22 to provide the desired damping/sealing function. It will be recognized that with the axially angled feature of the central body portion 88 and the rearward extension of the flange 26, the center of gravity of the damper/seal 24 is located outside, or to the right as seen in FIG. 16, of the axial pivot point of the damper. This pivot point will be located somewhere in the dovetail slot and will generally be substantially in the axial center of the dovetail portion 87. It should be recognized that the axial thickness of the dovetail portion 87 and the tightness within the dovetail slot should be limited to facilitate this pivoting in the axial plane.

In operation, when the disk and damper 24 are rotated, the centrifugal force acts at the center of gravity C.G. and, since this is axially offset from the radial support point, the force tends to rotate the damper/seal 24 counterclockwise to thereby provide an axial force to the aft shank rail 22 of the blade by way of the flange forward face 91. In this way, the magnitude of the damping force is proportional to the speed of the rotor, a characteristic which is desirable when considering the nature of blade vibrations.

In addition to providing a damping force which is independent of the clamping force maintained by the aft retainer 28, the above-described damper/seal arrangement eliminates the thermally generated hoop stresses of prior damper arrangements, removes the aft retainer, which is sensitive to high temperature creep, from exposure to the high temperature gases, and allows the damper which is exposed to the high temperature path to be fabricated from high temperature resistant cast material. Further, the damper/seal 24 can be tuned to vary the damping force by shifting the mass and center of gravity thereof.

A further advantage of the above-described damper/seal can be seen by reference to FIG. 16 wherein the rearward extending flange of the damper/seal 24 is closely disposed to the forward extending flange 92 of the associated stationary platform to jointly form a buffer seal between the hot gas path and the internal rotor cavity disposed radially inward thereof. This sealing combination complements that formed between the aft flange 37 and the stationary seal 93.

It should be recognized that the present damper/seal 24 can be used with retainer apparatus other than that described hereinabove. FIG. 19 shows such an alternative embodiment wherein the damper/seal 24 is held in place by an aft retainer 28 in the same manner as described hereinabove, but the aft retainer/seal 28 is secured by a plurality of fasteners or bolts 94. Although these bolt attachments are undesirable for the reasons discussed hereinabove, the damper/seal 24 will operate satisfactorily and independent of this attachment.

It will understood that the present invention has been described in terms of particular embodiments, but may take on any number of other forms while remaining within the scope and intent of the invention. For example, it will be recognized that the present invention has been described in terms of use with a turbine blade or blades but could as well be applied to compressor or fan blades.

Having thus described the invention, what is claimed as novel and desired to be secured by Letters Patent of the United States is:

1. A circumferentally segmented blade damper having a lower portion which is restrained in both the radial and axial directions in such a way as to be pivotable in an axial plane, and an upper portion having a pressure bearing surface for axial damping engagement with a blade surface, said damper having a center of gravity which is in a radial plane that is axially spaced from that of the damper's radial restraining point such that when said damper is rotated, centrifugal force causes said pressure bearing surface to pivot against said blade surface.

2. A blade damper as set forth in claim 1 wherein said damper lower portion is restrained in the axial direction by a blade retainer element extending radially outwardly to engage said damper lower portion on its one side.

3. A blade damper as set forth in claim 1 wherein said damper lower portion includes a dovetail for placement in the dovetail slot of the disk.

4. A blade damper as set forth in claim 1 wherein said damper upper portion includes a flange portion extending axially away from the blade to extend the center of gravity in that direction.

5. A blade damper as set forth in claim 1 wherein said damper upper portion includes a flange portion extending toward and into engagement with said blade.

6. A blade damper as set forth in claim 1 wherein said damper upper portion engages the shank rail portion of said blade.

7. A blade damper as set forth in claim 1 wherein said blade retainer element comprises a ring which restrains a plurality of damper segments.

8. A blade damper as set forth in claim 1 wherein the circumferential length of each blade damper segment is such that, when the damper segment is in the installed position, it abuts a similar damper segment on either side thereof.

9. A circumferently segmented damper for application to a blade having a dovetail disposed in an axial dovetail slot of a disk comprising:
 (a) means for securing said damper near its radially inner end to said disk in such a way to allow said damper to pivot in an axial plane; and
 (b) means at the radially outer end of said damper for engaging said blade, said engaging means being so constructed that the center of gravity of said damper is axially spaced from said securing means such that when said damper is rotated, centrifugal force tends to cause an axial pivoting thereof to exert an axial damping force against said blade.

10. A damper as set forth in claim 9 wherein said damper has, at its radially inner end, a dovetail for axial insertion into said dovetail slot.

11. A damper as set forth in claim 9 wherein said securing means comprises a blade retainer element which engages said damper on its one axial side.

12. A damper as set forth in claim 9 wherein said engaging means includes a flange portion extending axially away from the blade to extend the center of gravity in that direction.

13. A damper as set forth in claim 9 wherein said engaging means includes a flange extending forwardly and into engagement with said blade.

14. A damper as set forth in claim 9 wherein said engaging means engages a shank rail portion of said blade.

15. A damper as set forth in claim 11 wherein said blade retainer element comprises a ring which engages a plurality of damper segments.

* * * * *